PATENTED FEB 15 1972 3,642,304

INVENTORS:
JAMES T. JOHNSON
LESTER E. SMITH

BY William W. Jones

ATTORNEY

United States Patent
Johnson et al.

[15] 3,642,304
[45] Feb. 15, 1972

[54] SAFETY BAG INFLATION SYSTEM FOR VEHICLES

[72] Inventors: James T. Johnson; Lester E. Smith, both of Herrin, Ill.

[73] Assignee: Olin Corporation

[22] Filed: June 16, 1970

[21] Appl. No.: 46,663

[52] U.S. Cl. .................................................. 280/150 AB, 222/5
[51] Int. Cl. ................................................................ B60r 21/10
[58] Field of Search .................... 280/150; 141/10, 67, 68, 4; 9/313–318, 324; 23/281; 222/3, 5; 102/39

[56] References Cited

UNITED STATES PATENTS

| | | | |
|---|---|---|---|
| 3,269,310 | 8/1966 | Wismar | 9/321 |
| 3,180,373 | 4/1965 | Hebenstreit | 23/281 X |
| 1,933,694 | 11/1933 | Allen et al | 102/39 X |
| 3,117,424 | 1/1964 | Hebenstreit | 222/3 |
| 3,197,234 | 7/1965 | Bertrand | 280/150 |
| 3,450,414 | 6/1969 | Kobori | 280/150 |

*Primary Examiner*—Kenneth H. Betts
*Attorney*—Donald R. Motsko, H. Samuel Kieser and William W. Jones

[57] ABSTRACT

A system for inflating a safety bag in a vehicle upon a collision, wherein additional energy is supplied to a volume of pressurized gas stored in a reservoir, the additional energy being supplied by controlled combustion of a propellant charge to produce combustion gases which admix with the pressurized gas. The mixture of gases thus flows to the safety bag to inflate the latter. Energy produced by combustion of the propellant is also used to open a sealed flow path to the safety bag.

5 Claims, 3 Drawing Figures

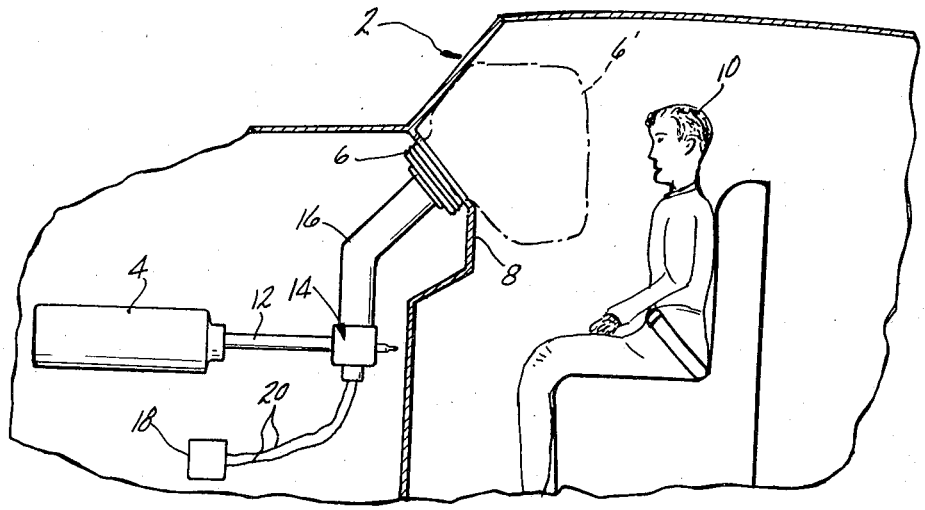

SAFETY BAG INFLATION SYSTEM FOR VEHICLES

This invention concerns a system for inflating a safety bag in a vehicle to cushion an occupant in the vehicle in the event of a collision involving the vehicle.

Inflatable safety bags or confinements used to protect an occupant of a vehicle from injury in case of a collision involving the vehicle are known to the prior art. Generally, such confinements are inflated by opening a reservoir of pressurized gas when a collision occurs to permit the gas to flow to the confinement to inflate the latter. Prior to inflation thereof, the confinement is generally stored in the vehicle in a collapsed condition within the dashboard, steering column, ceiling, or whatever place the body of an occupant might be liable to impact in the event of a collision. In order to inflate the confinement, the systems of the prior art require that the inflating gas be stored at very high pressures, and substantial problems preventing leakage of the gas have been encountered, particularly since the systems must be made leakproof for substantial periods of time measuring in years. Since a vehicle may be owned and operated for years without being involved in a collision, it is essential that even minimal leakage from the pressurized gas reservoir must be avoided if the system is to remain viable whenever needed.

Great expense has been encountered in producing reservoirs capable of maintaining the pressurized gas for such extended time periods. The majority of inflating systems known previously utilized some type of detonator to rupture a part of the gas reservoir when a collision occurs to permit the gas to flow to the confinement. Thus the most expensive part of the system is destroyed when used, and must be completely replaced after the collision. It follows that the systems of the prior art cannot simply be recharged and again made usable by the replacement of an inexpensive part of the system.

The system of this invention includes a reservoir for a supply of pressurized fluid which is maintained at a lower pressure than is commonly required to inflate safety bags. An open conduit extends from the reservoir to a housing interposed between the reservoir and the deflated confinement or safety bag. A seal in the housing prevents the pressurized fluid from flowing to the confinement. A sealed combustion chamber containing a charge of propellant is connected to the housing and mechanically sealed from the interior or fluid-containing portion thereof, and an explosive squib is associated with the propellant charge for ignition thereof. A conventional collision sensor is connected to the squib by means of electrical conductors in such a way that an electrical current is passed to the squib to ignite the latter when a collision occurs. When the squib is ignited, the propellant charge is also ignited to produce combustion gases and thus increase pressure in the combustion chamber. When the combustion chamber increases beyond a predetermined value, the mechanical seal between the combustion chamber and the housing is blown out of place and caused to impact and rupture the seal between the confinement and the reservoir. The latter seal is thus broken and a mixture of the stored pressurized fluid and combustion gases is permitted to flow to the confinement to inflate the confinement. To rebuild the system after use thereof, one need merely replace the housing which is an inexpensive component of the system. An orifice in the housing is used to refill the reservoir with pressurized fluid after which the orifice is plugged and the system is ready to be used again.

It is, therefore, an object of this invention to provide a system for inflating a safety bag in a vehicle in the event of a collision by the vehicle, which system includes a reservoir for storing fluid at a pressure in a volume which is less than the volume needed to inflate the bag to the required pressure without the addition of heat and gas from the propellant charge.

It is another object of the invention to provide a system of the character described wherein the fluid reservoir is not damaged by actuation of the system.

It is yet another object of the invention to provide a system of the character described wherein a propellant charge is utilized to produce combustion gases to substantially aid the pressurized fluid in inflating the safety bag.

It is still another object of the invention to provide a system of the character described wherein a mechanical means is actuated by combustion gas pressure to break a seal between the fluid reservoir and the safety bag whereby combustion gases and pressurized fluid are caused to flow together to the safety bag.

These and other objects and advantages of this invention will become readily apparent to those skilled in the art from the following detailed description of a preferred embodiment when taken in conjunction with the accompanying drawings, in which.

Figure 1:
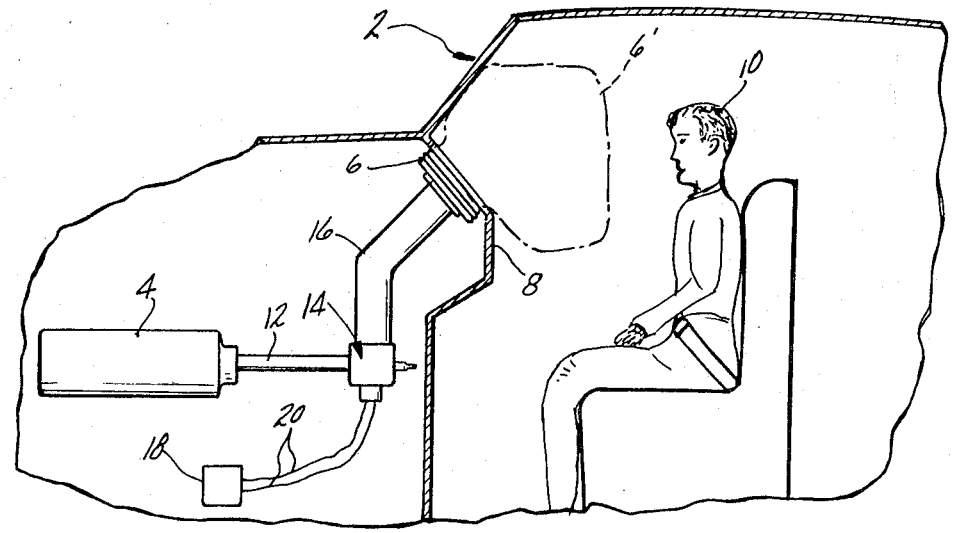
FIG. 1 is a side elevational view of the system of this invention as arranged in a vehicle shown fragmentarily.

Referring now to FIG. 1, a preferred embodiment of the system of this invention is shown mounted in a vehicle 2, which is shown fragmentarily. The system includes a reservoir 4 which contains a supply of pressurized fluid to aid in inflating a confinement 6 shown mounted in the dashboard 8 of the vehicle, the confinement 6 being shown in its deflated or collapsed storage condition. When inflated after a collision, the confinement will expand to the configuration 6' shown in phantom to present a soft cushion against which an occupant 10 of the vehicle will be moved. The confinement 6 can take the form of a flexible bag of rubber, cloth, or the like, and can be vented in any known manner, or non-vented as desired. The reservoir 4 can be as small as 60 cubic inches in volume and contain fluid stored at a pressure of about 2,400 p.s.i. and still inflate a bag having a 10 cubic foot volume. In order to inflate a 10 cubic foot bag with the systems of the prior art, a reservoir having a volume of 160 cubic inches storing a fluid at 3,500 p.s.i. must be used.

A conduit 12 extends from the reservoir 4 to a housing member indicated generally by the numeral 14, with a second conduit 16 leading from the housing 14 to the confinement 6. A collision sensor 18 of conventional construction is secured to the vehicle 2, the sensor 18 being of the variety which produces an electrical current when the vehicle is involved in a collision of predetermined magnitude. Electrical conductors 20 connect the sensor 18 with the housing 14.

Figure 2:
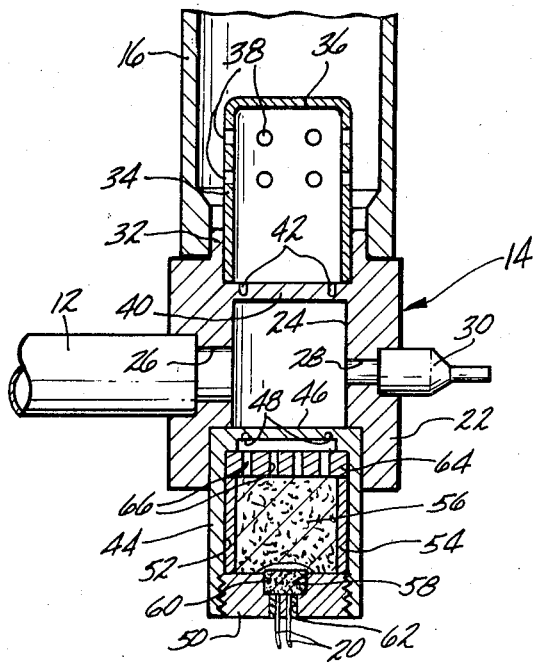
FIG. 2 is a sectional view of the housing portion of this invention showing the seals and the arrangement of the propellant charge.

Referring now to FIG. 2, a sectional view of the housing 14 and associated conduits 12 and 16 is shown. The housing 14 includes a main body portion 22 having a central cavity 24 into which an inlet passage 26 opens. The conduit 12 from the reservoir 4 opens into the inlet passage 26. A filling orifice 28 opens into the cavity 24 and may be thus used to fill the reservoir 4 with pressurized fluid when the system is initially constructed. After the reservoir has been thus filled, a plug 30 is fitted into the orifice 28 to seal the cavity 24 against fluid leakage. The plug 30 may be welded or otherwise permanently set in place in the orifice 28.

The exterior of one wall of the body portion 22 includes an annular projection 32 around the outside of which is mounted the second conduit 16 leading to the confinement. The conduit 16 is connected to the body portion 22 by welding, or in some other known manner so as to form a gastight interface therewith. A cup-shaped diffuser member 34 is similarly mounted on the inside of the projection 32, the diffuser 34 having a closed end wall 36 and a number of openings 38 in its side wall serving a purpose set forth in greater detail hereinafter. Interposed between the cavity 24 and the interior of the diffuser 34 is a transverse, integral wall 40 of the body portion 22. The wall 40 is inscribed or weakened, as at 42 so as to readily rupture in a manner set forth in greater detail hereinafter. The wall 40 as shown in FIG. 2 serves to seal the cavity 24 from the interior of the conduit 16 thus providing mechanical seal means preventing flow of fluid from the conduit 12 to the conduit 16.

A cup-shaped member 44 having a closed end wall 46 is secured to the body portion 22 by welding or in some other manner to seal the cavity 24. The wall 46 is inscribed or weakened, as at 48, so as to be readily ruptured and displaced in a manner set forth in greater detail hereinafter. The wall 46 is directly opposite the wall 40 so as to be able to act upon the latter in a manner to be clarified hereinafter. A plug member 50 is screwed into or otherwise secured to the opposite end of the member 44 to close the interior thereof and form therein a combustion chamber 52. A sleeve 54 is fitted into the combustion chamber 52, and a propellant charge 56 is disposed in the sleeve 54 and thus in the combustion chamber 52. The propellant is preferably of the type which produces nontoxic combustion gases. The plug 50 includes a recess 58 in which is positioned a squib 60 of explosive material. A bore 62 extends through the plug 50 into the recess 58 and the electrical conductor wires 20 extend through the bore 62 to contact the squib 60. The bore 62 is sealed with a conventional plastic or other material. A plate 64 having a plurality of orifices 66 is interposed between the propellant charge 56 and the end wall 45 of the member 44.

Figure 3:
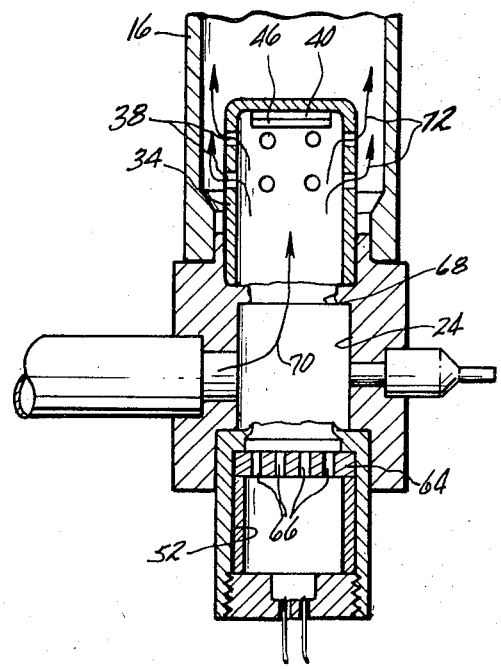
FIG. 3 is a sectional view of the housing portion of the invention as it appears after a collision has occurred and the seals have been broken to permit pressurized fluid and combustion gases to flow to the confinement for inflation thereof.

With particular reference to FIG. 3, the operation of the system is set forth as follows. When the vehicle 2 is involved in a collision of sufficient magnitude, the sensor 18 sends an electrical current through the wires 20 to the squib 60 which is thus caused to ignite. The ignition of the squib 60 in turn causes the propellant charge 56 to burn thus creating combustion gases in the combustion chamber 52 to raise the pressure therein. When the pressure in the combustion chamber 52 reaches a predetermined level, preferably about 3,000 p.s.i., the chamber wall 46 is forcibly torn from its position and propelled across the cavity 24 to impact the cavity wall 40. The force of this impact forcibly tears the wall 40 from its position and both the wall parts 46 and 40 are propelled into the interior of the diffuser 34 and come to rest against the bottom wall 36 thereof, as shown in FIG. 3. An outlet opening 68 is thus formed between the cavity 24 and the interior of the diffuser 34. The pressurized fluid from the reservoir 4 thus flows along a flow path denoted generally by the arrow 70 into the interior of the diffuser 34 where the fluid passes through the holes 38, as denoted by the arrows 72, and thence through the conduit 16 to the confinement to inflate the latter. The orifice plate 64 restricts passage of combustion gases from the combustion chamber 52 to the housing cavity 24, thus maintaining an elevated pressure within the combustion chamber 52 to promote complete burning of the propellant charge 56 and control and prevent the combustion gases from flowing backward into the reservoir. Thus an extended flow of combustion gases is caused to occur from the combustion chamber 52 to the housing cavity 24 where admixing of the combustion gases and pressurized fluid occurs. The admixture of the gases and fluid flows to the confinement to combine to inflate the confinement. A 10 cubic foot confinement has consistantly been completely inflated in less than 50 milliseconds with the system of this invention.

In this manner, the storage fluid pressure originally present in the reservoir is never exceeded when the system is used, and no damage is inflicted on the expensive reservoir during use of the system. A mechanical seal is provided between the combustion chamber and the interior of the housing, with the mechanical seal also providing a mechanical means for breaking the seal between the interior of the housing and the conduit to open a flow path between the fluid reservoir and the confinement. A mixture of pressurized fluid from the reservoir and combustion gases from the propellant charge are thus used to inflate the confinement. The system of this invention does not result in destruction of, nor present the danger of damage to the fluid reservoir since the original storage pressure within the reservoir is not exceeded when the system is actuated. The system of this invention also permits the use of a considerably smaller storage reservoir containing fluid maintained at a considerably lower pressure than is possible with the systems of the prior art.

Since many changes and variations of the disclosed embodiment of the invention can be made without departing from the inventive concept, it is not intended to limit the invention otherwise than as required by the appended claims.

What is claimed is:

1. Apparatus for use in a vehicle safety system utilizing an inflatable confinement, a reservoir of pressurized fluid, and a propellant charge for generating hot gas, said apparatus comprising:
   a. housing means having an interior adapted for open communication with the reservoir, and having a fluid outlet for connection to the confinement;
   b. first means closing said housing outlet against fluid flow;
   c. means connected to said housing for providing a chamber to receive an ignitable, hot gas-generating charge of propellant; and
   d. mechanical means sealing said chamber from the interior of said housing and operable upon development of a predetermined chamber pressure after ignition of the propellant, to unseal said chamber and impact said first means to disable the latter from closing said outlet to permit fluid and hot gas to flow to the confinement.

2. Apparatus for use in a vehicle safety system for protecting an occupant of a vehicle during a collision and utilizing an inflatable confinement, and a reservoir containing pressurized fluid for use in inflating the confinement, said apparatus comprising:
   a. housing means providing a passage for forming a portion of a fluid flow path between the reservoir and confinement, said housing means having an inlet and an outlet, said inlet being adapted for fluid communication with the reservoir;
   b. first means closing said housing outlet against fluid flow from the reservoir to the confinement;
   c. means connected to said housing to provide a chamber adapted to receive an ignitable, hot gas-generating charge of propellant; and
   d. mechanical means sealing said chamber from said passage and operable, upon development of a predetermined chamber pressure after ignition of a propellant charge, to unseal said chamber and impact and thereby disable said first means from closing said outlet to permit fluid and hot gas to flow to the confinement.

3. Vehicle safety apparatus for protecting an occupant of a vehicle during a collision, said apparatus comprising:
   a. a confinement having a deflated condition and an inflated condition;
   b. reservoir means containing a fluid under pressure;
   c. fluid communication means providing a fluid flow path between said reservoir means and said confinement;
   d. first means closing said flow path against fluid flow from said reservoir means to said confinement;
   e. means adjacent said flow path to provide a chamber;
   f. an ignitable, hot gas-generating propellant charge positioned in said chamber;
   g. mechanical means sealing said chamber from said flow path, said mechanical means being aligned with said first means, and said mechanical means, upon development of a predetermined chamber pressure after ignition of said propellant charge, being operable to unseal said chamber from said flow path and disable said first means from closing said flow path to permit fluid and hot gas to flow to said confinement to inflate the latter.

4. Vehicle safety apparatus for protecting an occupant of a vehicle during a collision, said apparatus comprising:
   a. a confinement having a deflated condition and an inflated condition;
   b. reservoir means containing a fluid stored at a predetermined pressure;
   c. fluid communication means for providing a fluid flow path between said reservoir means and said confinement;

d. first means closing said flow path against fluid flow from said reservoir means to said confinement;

e. means associated with said fluid communication means and operative to produce combustion gases and introduce the latter into said fluid communication means to admix with pressurized fluid; and f. mechanical means opposite said first means and operative to disable the latter from closing said flow path when combustion gases are produced to permit fluid and gases to flow to said confinement to inflate the latter.

5. The apparatus of claim 4, further comprising means adjacent said combustion gas-producing means and operative to prevent combustion gases from flowing into said reservoir means to prevent pressure in the latter from exceeding said predetermined storage pressure.

* * * * *